(12) United States Patent
Sugumar et al.

(10) Patent No.: US 9,817,470 B2
(45) Date of Patent: Nov. 14, 2017

(54) PROCESSOR POWER MANAGEMENT RESPONSIVE TO A SEQUENCE OF AN INSTRUCTION STREAM

(71) Applicant: QUALCOMM Incorporated, San Diego, CA (US)

(72) Inventors: Suresh Sugumar, Bangalore KRN (IN); Jeffrey Gemar, San Diego, CA (US); Ali Taha, San Diego, CA (US); Amy Derbyshire, Boulder, CO (US); Tao Xue, San Diego, CA (US); Mohammad Tamjidi, San Diego, CA (US); Rajat Mittal, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/052,786

(22) Filed: Feb. 24, 2016

(65) Prior Publication Data
US 2016/0246362 A1   Aug. 25, 2016

Related U.S. Application Data

(60) Provisional application No. 62/120,826, filed on Feb. 25, 2015.

(51) Int. Cl.
   *G06F 1/32*   (2006.01)
(52) U.S. Cl.
   CPC .......... *G06F 1/3296* (2013.01); *G06F 1/3206* (2013.01); *G06F 1/3243* (2013.01); *G06F 1/3287* (2013.01); *Y02B 60/1239* (2013.01)

(58) Field of Classification Search
   CPC ............................ G06F 1/3287; G06F 1/3296
   See application file for complete search history.

(56) References Cited

U.S. PATENT DOCUMENTS

| | | | |
|---|---|---|---|
| 8,327,126 B2 | 12/2012 | Bell, Jr. et al. | |
| 9,032,226 B2 | 5/2015 | Kumar et al. | |
| 9,081,577 B2 | 7/2015 | Conrad et al. | |
| 2011/0208505 A1* | 8/2011 | Mayhew | G06F 1/3203 703/26 |
| 2011/0208585 A1 | 8/2011 | Daboll et al. | |
| 2011/0296149 A1 | 12/2011 | Carter et al. | |

(Continued)

OTHER PUBLICATIONS

International Search Report and Written Opinion—PCT/US2016/019571—ISA/EPO—Jun. 1, 2016.

*Primary Examiner* — Albert Wang
(74) *Attorney, Agent, or Firm* — Arent Fox LLP

(57) ABSTRACT

An apparatus includes a first circuit and a second circuit sharing an instruction stream. A voltage controller circuit is configured to provide an operation voltage and at least one low-power voltage to the second circuit independent of a supply voltage of the first circuit in response to a sequence of the instruction stream. In another aspect, a method of operating a power management function is presented. The method includes providing an instruction stream for a first circuit and a second circuit and providing selectively an operation voltage and at least one low-power voltage to the second circuit independent of a supply voltage of the first circuit in response to a sequence of the instruction stream.

27 Claims, 12 Drawing Sheets

(56) References Cited

U.S. PATENT DOCUMENTS

| | | | |
|---|---|---|---|
| 2012/0117357 A1* | 5/2012 | Kwon | G06F 1/3203 |
| | | | 712/1 |
| 2013/0155081 A1 | 6/2013 | Khodorkovsky et al. | |
| 2014/0006817 A1* | 1/2014 | Bonen | G06F 1/3243 |
| | | | 713/320 |
| 2014/0189225 A1* | 7/2014 | Conrad | G06F 1/3243 |
| | | | 711/105 |
| 2015/0058650 A1 | 2/2015 | Varma et al. | |
| 2015/0177823 A1* | 6/2015 | Maiyuran | G06F 1/324 |
| | | | 713/320 |

* cited by examiner

PROCESSOR POWER MANAGEMENT RESPONSIVE TO A SEQUENCE OF AN INSTRUCTION STREAM

CROSS-REFERENCE TO RELATED APPLICATION(S)

This application claims the benefit of U.S. Provisional Application Ser. No. 62/120,826, entitled "PROCESSOR POWER MANAGEMENT" and filed on Feb. 25, 2015, which is expressly incorporated by reference herein in its entirety.

BACKGROUND

Field

The disclosure relates to methods and apparatuses with power management functions and, in particular, to electronic apparatuses, integrated circuits (ICs), processors, etc., integrated with power mitigation functions.

Background

Increasingly, power management is becoming an issue in operating ICs. For example, wireless communication technologies and devices (e.g., cellular phones, tablets, laptops, etc.) have grown in popularity and uses over the past several years. These electronic apparatuses have grown in complexity and now commonly include multiple processors (e.g., baseband processor and application processor) and other resources that allow the users to execute complex and power intensive software applications (e.g., music players, web browsers, video streaming applications, etc.). To meet the increasing performance demand, the processors have increased in complexity and operating frequencies. As a result, substantial power may be consumed, and considerable heat may be produced while operating the processors.

One design challenge is to manage the power issue. For example, it is desirable for the battery life of a cell phone to last as long as possible with a single charge. Moreover, heat generated by the processors may affect the performance and the reliability of the device. For example, the performance of an IC degrades when operating in high temperature.

SUMMARY

Aspects of a method of operating a power management function are disclosed. The method includes providing an instruction stream for a first circuit and a second circuit and providing selectively an operation voltage and at least one low-power voltage to the second circuit independent of a supply voltage of the first circuit in response to a sequence of the instruction stream.

Aspects of an apparatus are disclosed. The apparatus includes a first circuit and a second circuit sharing an instruction stream. A voltage controller circuit is configured to provide an operation voltage and at least one low-power voltage to the second circuit independent of a supply voltage of the first circuit in response to a sequence of the instruction stream.

Aspects of an apparatus are disclosed. The apparatus includes a first circuit and a second circuit sharing an instruction stream. The apparatus further includes means for generating voltage control signals that provides selectively an operation voltage and at least one low-power voltage to the second circuit independent of a supply voltage of the first circuit in response to a sequence of the instruction stream.

It is understood that other aspects of apparatus and methods will become readily apparent to those skilled in the art from the following detailed description, wherein various aspects of apparatus and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

DETAILED DESCRIPTION

Figure 1:
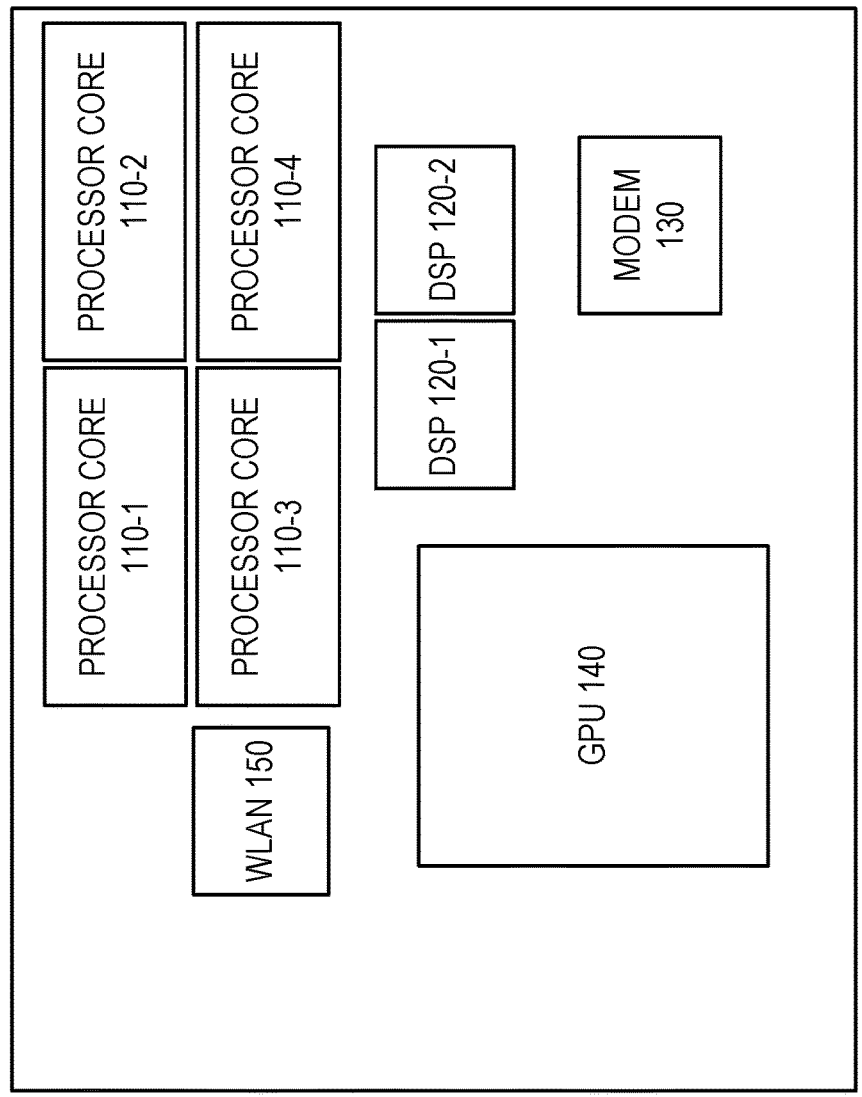
FIG. 1 is a diagram of an exemplary embodiment of a processor with multiple cores.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The term "apparatus" shall be construed to include any integrated circuit or system, or any portion of an integrated circuit or system (e.g., blocks, modules, components, circuits, elements, or the like). By way of example, the term "apparatus" may be used to refer to a processor or any portion of a processor (e.g., a combined application processor and baseband processor for a mobile device). Apparatus may be, for example, integrated circuit, system-on-chip, or a processor in a cell phone. The term "apparatus" shall also be construed to include any intermediate product where an integrated circuit or system is combined with other integrated circuits or systems (e.g., a video card, a motherboard, etc.) or any end product (e.g., mobile phone, personal digital assistant (PDA), desktop computer, laptop computer, palm-sized computer, tablet computer, work station, game console, media player, computer based simulators, or the like). The term "method" shall similarly be construed to include the operation of any integrated circuit or system, or any portion of an integrated circuit or system, or any intermediate product or end product, or any step, process, algorithm, or the like, or any combination thereof performed by such integrated circuit or system (or portion thereof), intermediate product, or end product.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. For example, the steps may be implemented by logic gates to perform the functions described herein, processor(s) performing those functions, circuits generating the signals for the functions described herein, or combinations thereof.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

The terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As used herein, two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of the stated features, integers, steps, operations, elements, and/or components, but do not preclude the presence or addition of one or more other features, integers, steps, operations, elements, components, and/or groups thereof. Moreover, as used herein, any reference to a signal may refer to the underlying conductor configured to carry the signal.

Various aspects of apparatus and methods for power management are presented with respect to a processor for wireless communication. However, as those skilled in the art will readily appreciate, aspects and applications of the disclosure may not be limited thereto. For example, the features presented may be applicable to other ICs and apparatuses besides a processor. Further, the features presented may be applicable to functions beyond wireless communication. Accordingly, all references to a specific application for the presented apparatus or method are intended only to illustrate exemplary aspects of the apparatus or method with the understanding that such aspects may have a wide differential of applications.

FIG. 1 is a diagram of an exemplary embodiment of a processor with multiple cores. In one example, an exemplary apparatus may be a cell phone incorporating the processor 100. The processor 100 may be a stand-alone processor or integrated in an end product, such as mobile phone, desktop computer, laptop computer, tablet computer, or the like. The processor 100 includes various cores or blocks of circuits, such as processor cores 110 (110-1, 110-2, 110-3, and 110-4), a graphic processor unit (GPU) 140, digital signal processors (DSP) (120-1 and 120-2), a modem 130, and a wireless local area network or WLAN block 150. A core may be, for example, a collection of circuits.

In an exemplary embodiment, the processor 100 may be configured to operate various power management functions on any of cores (such as the processor cores 110), distributed over several of the cores, or any other suitable configurations. In one example, the various power management functions may be operated by a processor (such as the processor core 110) operating software instructions. Thus, an exemplary embodiment apparatus may be the processor 100 or a cell phone incorporating the processor 100.

Figure 2:
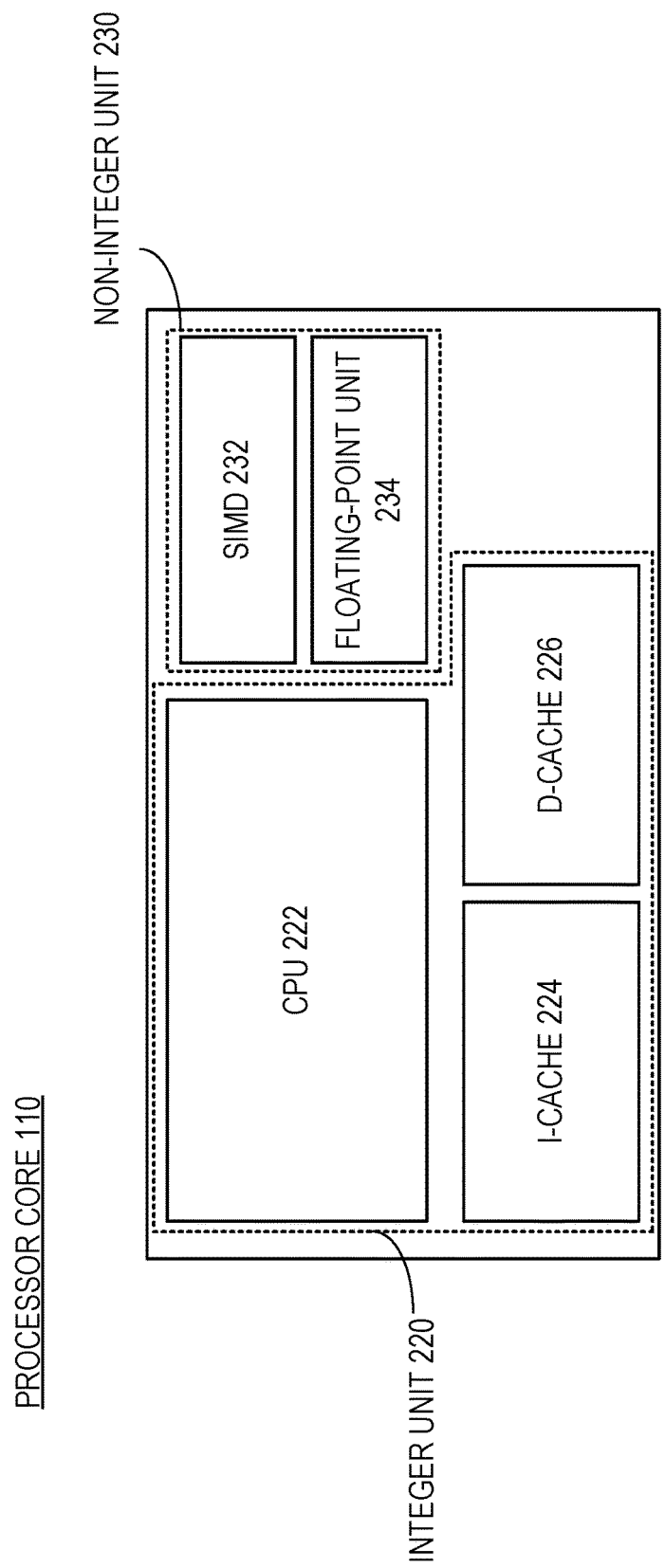
FIG. 2 is a diagram an exemplary embodiment of a processor core integrated with power management function integrated.

FIG. 2 is a diagram an exemplary embodiment of a processor core integrated with power management function integrated. The processor core 110 includes a central processing unit (CPU) 222, an instruction cache 224, and a data cache 226 operating in integer domain. The CPU 222, instruction cache 224, and data cache 226 may be considered as part of an integer unit 220 as theses units operate in integer domain. The processor core 110 further includes a single-instruction-multiple-data (SIMD) processing unit 232 and a flowing-point unit (FPU) 234, which operate on floating point numbers. The SIMD processing unit 232 and the FPU 234 may be considered as a part of the non-integer unit 230 as they operate with floating point numbers. In an exemplary embodiment, the various power management functions may be operated by CPU 222.

Figure 3:
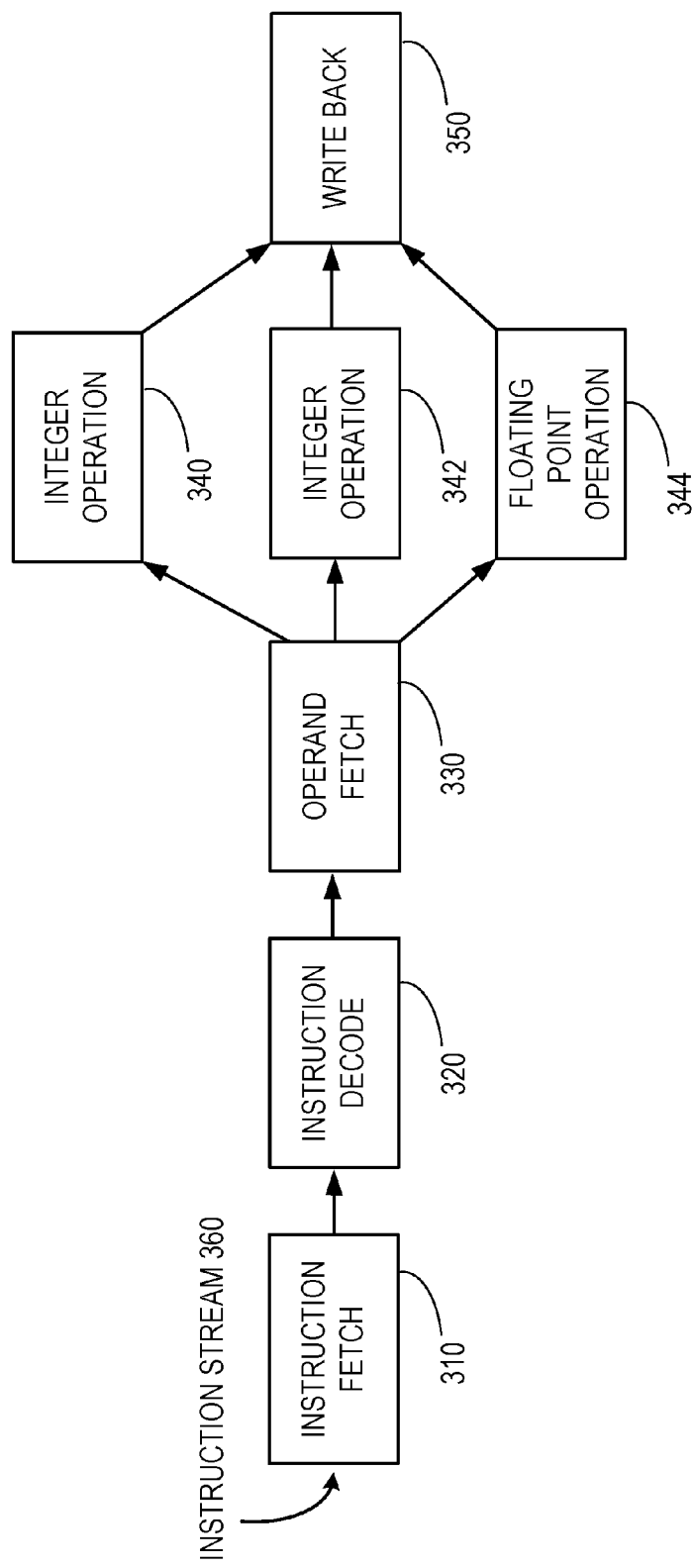
FIG. 3 is a diagram of the operation pipeline of an exemplary embodiment of a processor core integrated with power management function.

FIG. 3 is a diagram of the operation pipeline of an exemplary embodiment of a processor core integrated with power management function. At 310, the CPU 222 fetches instructions among the instruction stream 360 from, for example, the instruction cache 224. At 320, the CPU 222 decodes the fetched instruction. At 330, the CPU 222 fetches the operand(s) needed by the decoded instruction from, for example, the data cache 226, or a register file or memory on the processor 100. In certain instances, the operand(s) may be fetched from outside of the processor 100. At 340, 342, and 344, the decode instruction is executed. The CPU 222 may execute the integer operations 340 and 342. The SIMD processing unit 232 or the FPU 234 may execute floating point operations. Thus, the integer unit 220 (e.g., CPU 222) and the non-integer unit 230 (e.g., SIMD processing unit 232 and the FPU 234) share a same instruction stream 360. At 350, the result of the executed instruction is written back into the register file or memory.

The leakage power of the processor 100 may become more prominent as technology advances. For example, more and more processor cores 110 may be added to the processor 100. Given that operations 310, 320, 330, 340, 342, and 350 are all executed by the integer unit 220, the non-integer unit 230 may be put into a low-power mode when not in use to save power. An example of the low-power mode includes a retention mode in which a retention voltage is provided to the non-integer unit 230. The retention voltage is lower than an operation voltage of the non-integer unit 230 to reduce leakage power. In an exemplary embodiment, in the retention mode, the retention voltage is at a level such that the register states in the non-integer unit 230 may be preserved. The non-integer unit 230 may return from the retention mode to full operation after a relatively short delay (e.g., shorter than a delay to return from a power-off mode discussed below).

In the power-off mode, all supply power to the non-integer unit 230 may be turned off. Thus, the non-integer unit 230 draws almost no power in the power-off mode. Accordingly, the power-off mode would provide more power-saving than the retention mode. However, the non-integer unit 230 may require a longer delay to return to full operation from the power-off mode at least because various initialization routines may need to be performed.

Figure 4:
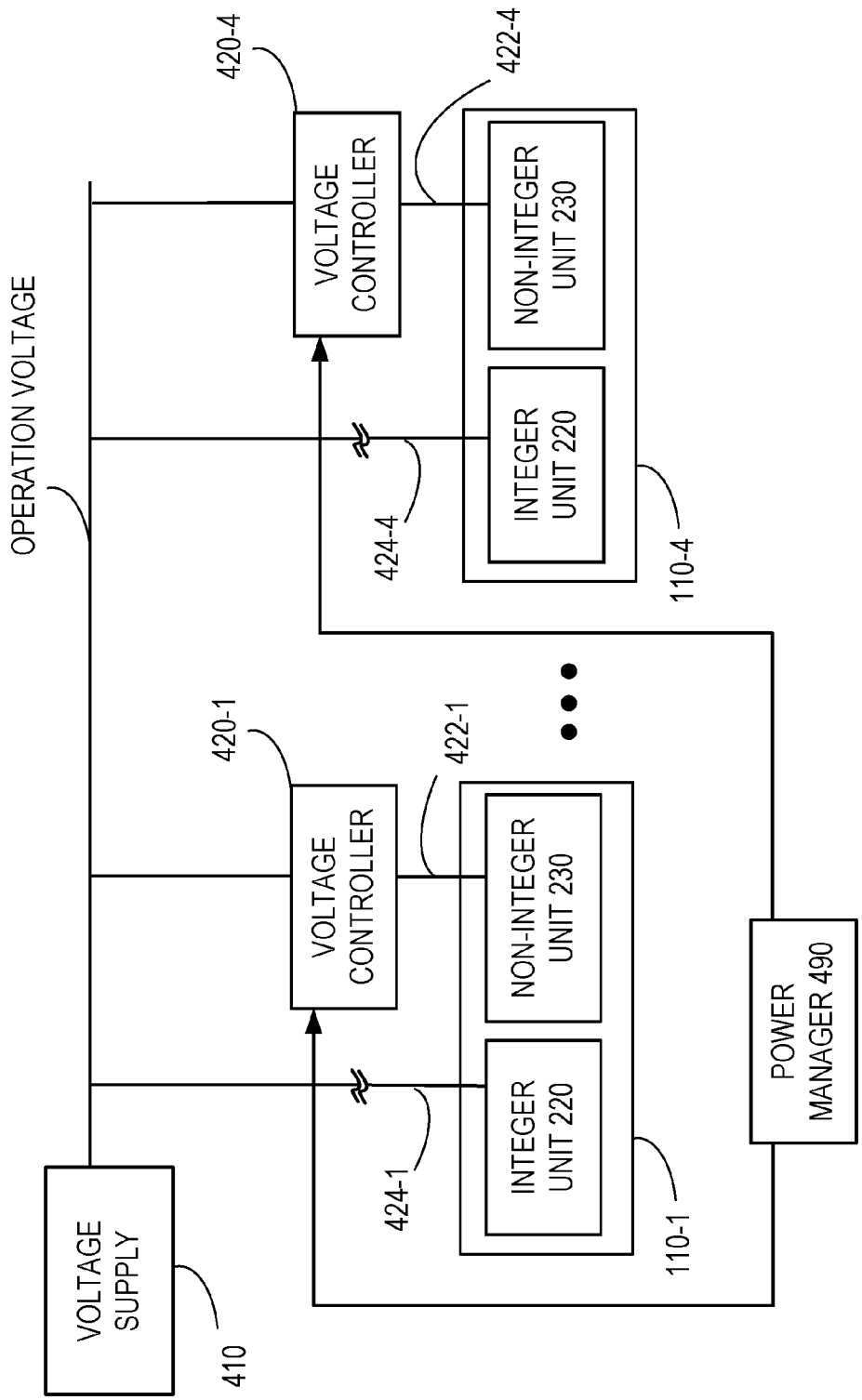
FIG. 4 is a diagram of an exemplary embodiment of an integer unit and a non-integer unit on separate power rails.

FIG. 4 is a diagram of an exemplary embodiment of an integer unit and a non-integer unit on separate power rails. A voltage supply (e.g., a low drop-out voltage regulator) provides an operation voltage to the processor cores 110-1-110-4 (only 110-1 and 110-4 are shown for clarity). A voltage controller 420-1 provides the supply voltage 422-1 to the non-integer unit 230 independent of the voltage supply of the integer unit 220. As shown in FIG. 4, the integer unit 220 and the non-integer unit 230 are on different power rails as the supply voltage of the integer unit 220 is provided via a path 424-1 different from the voltage controller 420-1. Moreover, the voltage controller 420-1 may be configured to provide the operation voltage and multiple low-power voltages (e.g., the retention voltage and ground for power-off mode) as the supply voltage 422 to the non-integer unit 230 of the processor core 110. In an exemplary embodiment, the voltage controllers 420-1-420-4 are controlled by a power manager 490 for generating the various supply voltages to the non-integer unit 230. In an exemplary embodiment, the power manager 490 provides means for generating voltage control signals that provides selectively an operation voltage and at least one low-power voltage to a second circuit (e.g., the non-integer unit 230) independent of a supply voltage of the first circuit (e.g., the integer unit 220).

Figure 5:
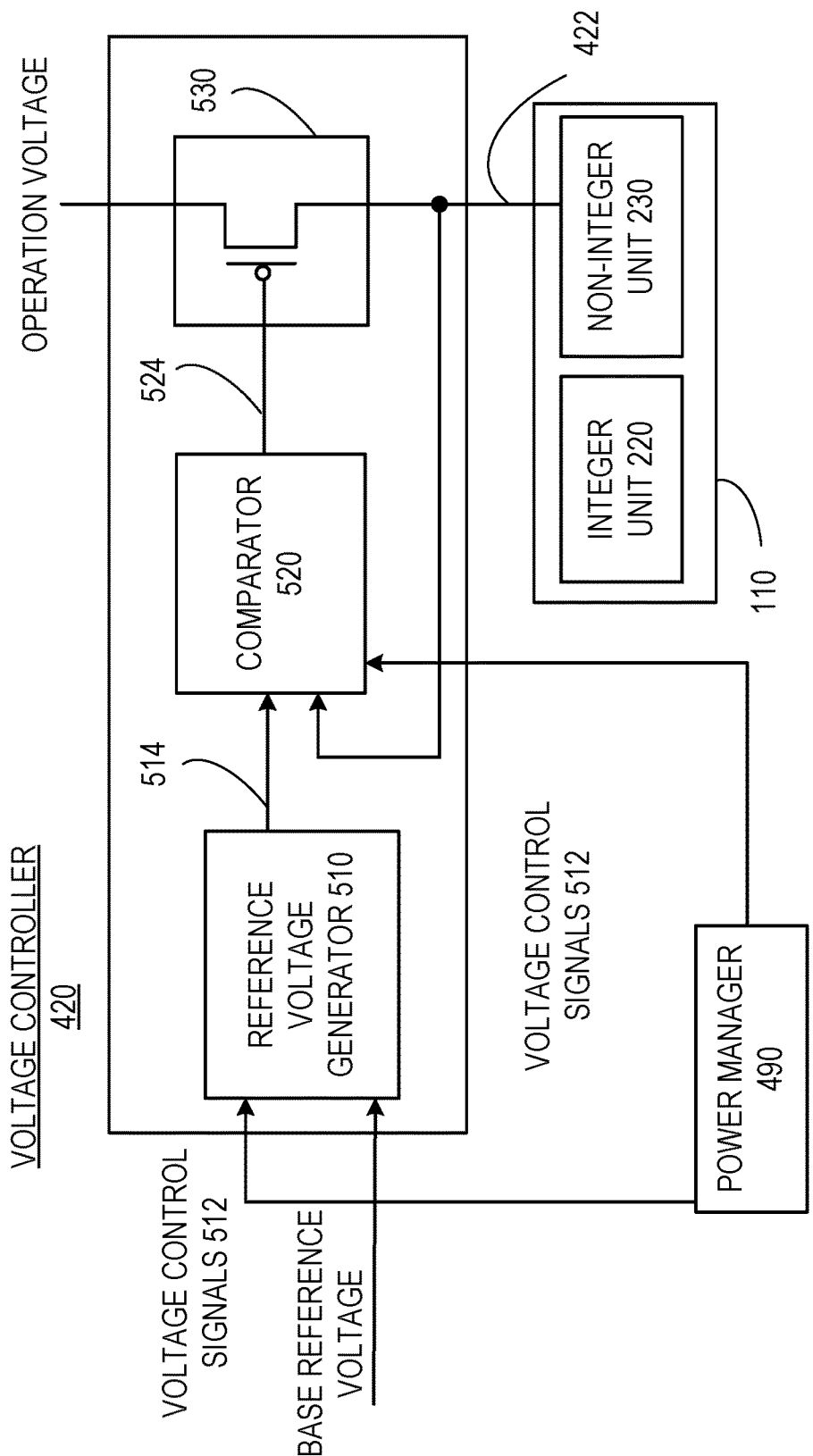
FIG. 5 is a diagram of an exemplary embodiment of a voltage controller that provides a supply voltage to a non-integer unit.

FIG. 5 is a diagram of an exemplary embodiment of a voltage controller that provides a supply voltage to a non-integer unit. The voltage controller 420 includes a reference voltage generator 510 configured to receive voltage control signals 512 and a base reference voltage. The base reference voltage may be a stable reference voltage such as a bandgap voltage reference. The reference voltage generator 510 may be, for example, a voltage multiplier that generates various voltages at output 514. For example, the voltage control signals 512 may instruct the reference voltage generator 510 to output at 514 various low-power voltages, such as the retention voltage described above. A power switch 530 receives the operation voltage and provides the supply voltage 422 to the non-integer unit 230 of the processor core 110. The power switch 530 is illustrated as a P-type transistor for reference only and is not limited thereto. The comparator 520 compares the voltage on 514 and the supply voltage 422 and adjusts the input 524 of the power switch 530 accordingly. In this fashion, the power switch 530 may provide and maintain the voltage at 514 (such as the retention voltage) as the supply voltage 422 to the non-integer unit 230. In another aspect of the voltage controller 420, the comparator 520 may receive the voltage control signals 512 to turn on the power switch 530 fully (e.g., for providing the operation voltage to the non-integer unit 230) or to turn off the power switch 530 fully (e.g., for providing the power-off voltage or ground to the non-integer unit 230). In an exemplary embodiment, the power manager 490 generates and provides the voltage control signals 512 to the reference voltage generator 510 and the comparator 520 to control the supply voltage 422 of the non-integer unit 230 as described above.

Figure 6:
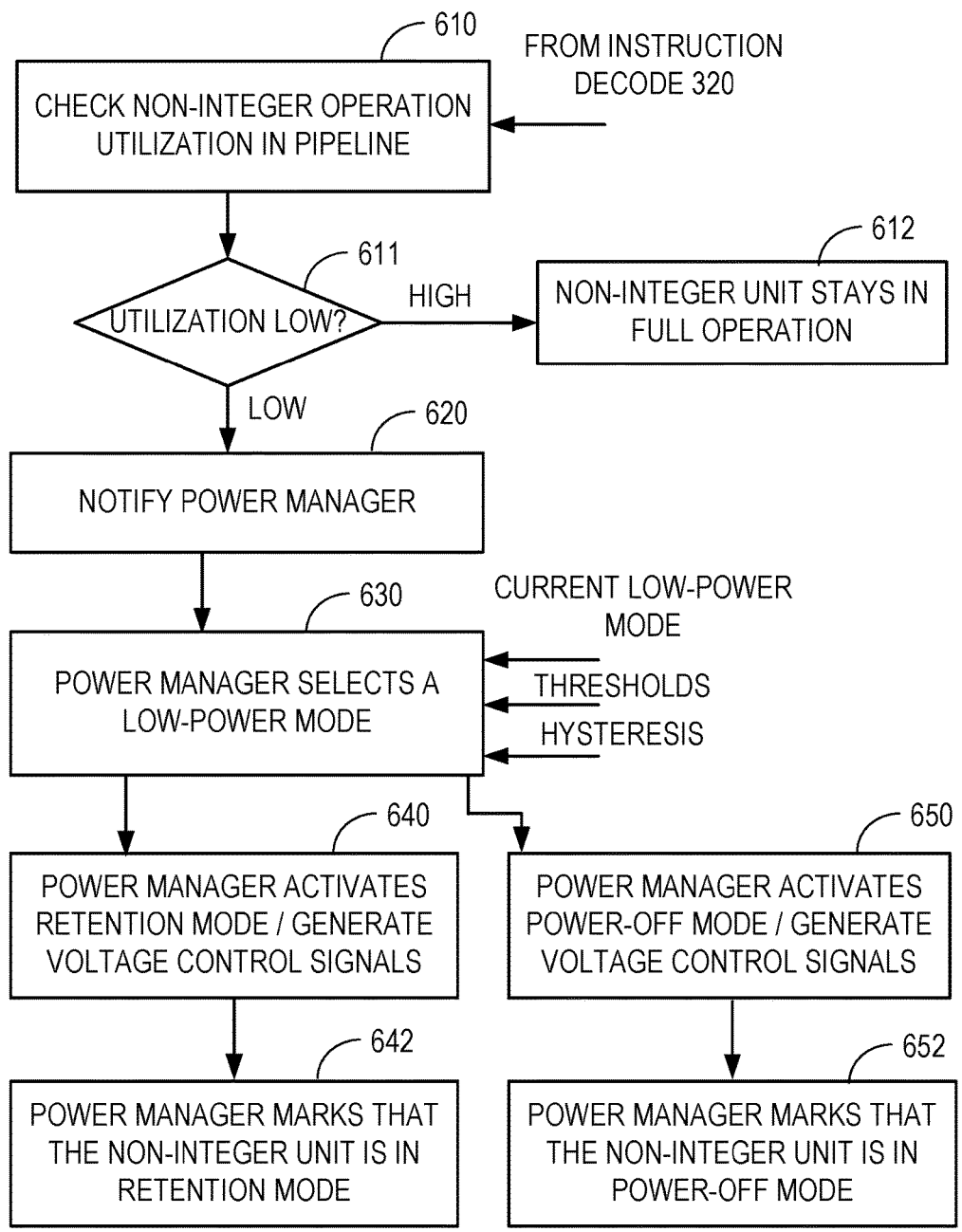
FIG. 6 is a diagram of an exemplary embodiment of an operation flow for entering a low-power mode.

FIG. 6 is a diagram of an exemplary embodiment of an operation flow for entering a low-power mode. These operations may be implemented in hardware/circuit, software, or combination thereof in accordance with the knowledge of persons of ordinary skill in the art. For example, the operations may be implemented by logic gates to perform the functions described herein, processor(s) performing those functions, circuits generating the signals for the functions described herein, or combinations thereof. In one example, these operations may be performed by a processor (e.g., the processor core 110) executing software instructions.

Referring to FIGS. 1-4 and 6, at 610, non-integer operation utilization in the pipeline (e.g., FIG. 3) is checked. For example, a processor core 110 of the processor 100 may check the decoded instruction stream from the instruction decode 320 for a sequence. In one example, the checked sequence is the utilization of the non-integer operations (e.g., the SIMD or FPU operations) in the instruction stream 360. In one example, the utilization of the non-integer operations is based on a programmed duration (e.g., a threshold) in which the SIMD or FPU operations have been absent. At 611, the non-integer operation utilization is determined against a threshold. In one example, the processor core 110 may determine that the non-integer operation utilization is high (e.g., a sequence of the decoded instructions from instruction decode 320 not utilizing the SIMD or FPU does not exceed the threshold). In this case, the non-integer unit stays in active mode or full operations (612). In this state, the operation voltage is supplied to the non-integer unit 230 of the processor core 110. If, at 611, the non-integer operation utilization is determined to be low (e.g., SIMD or FPU operations being absent in the instruction stream 360 for a duration exceeding the programmed duration or threshold), then the power manager 490 is notified (620).

At 630, the power manager 490 selects a low-power mode for the non-integer unit 230. For example, the selection may be based on the current low-power mode for the non-integer unit 230 and various hysteresis and thresholds for switching the low voltages among the low-power modes. For example, for the non-integer unit 230 already in retention mode and the non-integer operation utilization dropping below a second threshold, the power manager may select the power-off mode for the non-integer unit 230. When the non-integer operation utilization increases to be less than the second threshold plus a hysteresis, the power manager 490 may return the non-integer unit 230 to the retention mode.

At 640, the power manager 490 selects and activates the retention mode for the non-integer unit 230. The power manger may generate the voltage control signals 512 to cause the voltage controller 420 to provide the retention voltage to the non-integer unit 230 of the processor core 110. At 642, the power manager 490 marks that non-integer unit 230 is in a retention mode. For example, the power manager 490 may set a flag indicating that the non-integer unit 230 is in the retention mode.

At 650, the power manager 490 selects and activates the power-off mode for the non-integer unit 230. The power manger may generate the voltage control signals 512 to cause the voltage controller 420 to provide the power-off voltage (e.g., ground) to the non-integer unit 230 of the processor core 110. At 652, the power manager 490 marks that the non-integer unit 230 is in a power-off mode. For example, the power manager 490 may set a flag indicating that the non-integer unit 230 is in the power-off mode.

Figure 7:
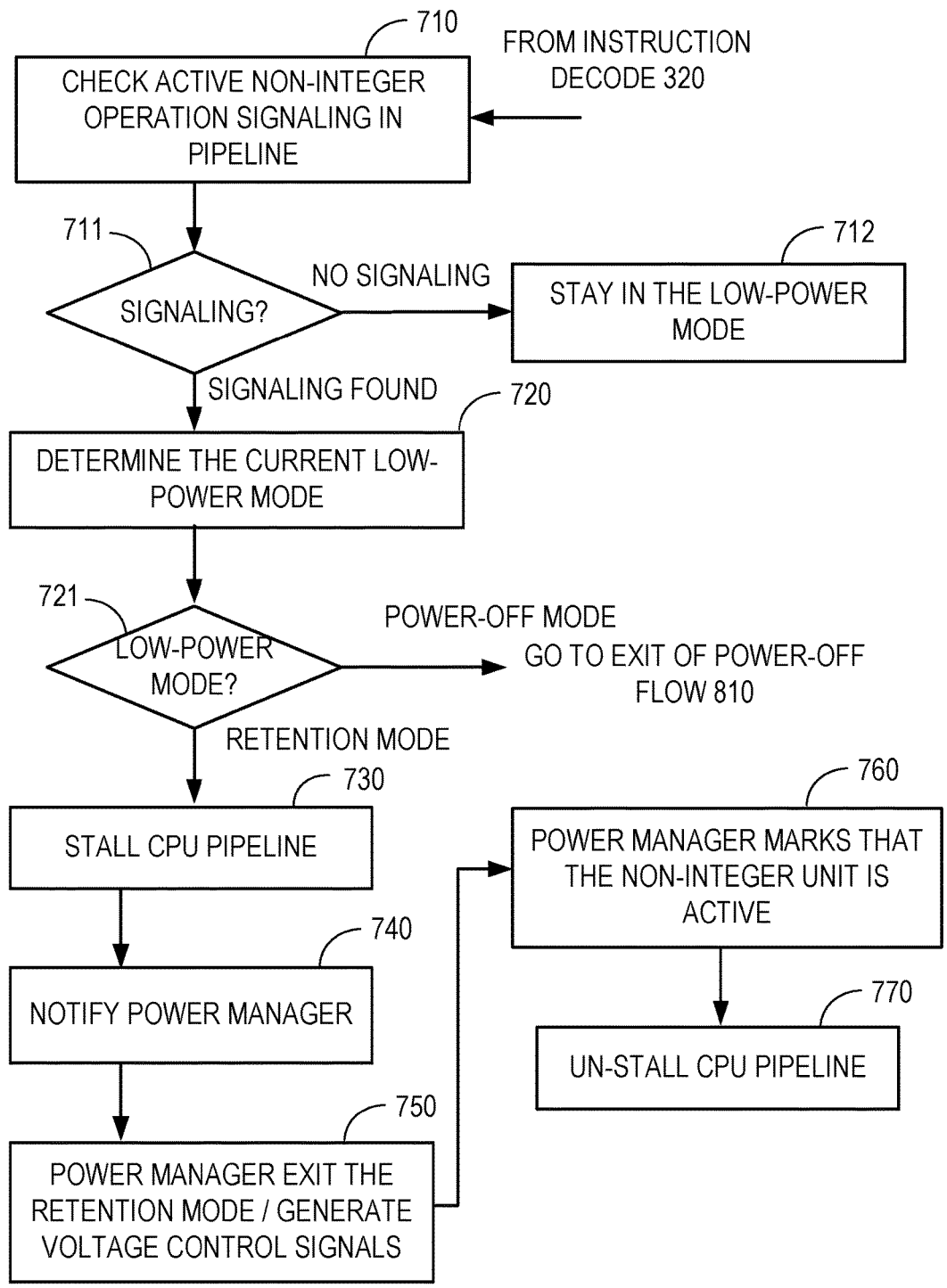
FIG. 7 is a diagram of an exemplary embodiment of an operation flow for exiting a low-power mode.

FIG. 7 is a diagram of an exemplary embodiment of an operation flow for exiting a low-power mode. Referring to FIGS. 1-4 and 7, at 710, an active non-integer operation signaling is checked. For example, a processor core 110 of the processor 100 may check the decode instructions in the instruction stream 360 (e.g., from instruction decode 320) for a non-integer operation signaling. Such signaling may be, for example, an instruction or instructions associated with the SIMD or FPU operations (but needs not be a SIMD or FPU instruction itself). In one example, the signaling of the instruction stream 360 for using the SIMD unit or FPU is checked.

At 711, a detection of the signaling is determined (e.g., by the processor core 110). At 712, if such signaling is not found, then the non-integer unit stays in the low-power node. At 720, an active non-integer operation signaling is found, and the current low-power mode is determined. For example, the processor core 110 may check a flag that indicates the current low-power mode of the non-integer unit 230. For example, the processor core 110 may check the flags indicating that the non-integer unit 230 is in the retention mode and the flag indicating that the non-integer unit 230 is in the power-off mode (see, e.g., steps 640 and 650). At 721, the low-power mode is determined to be, for example, the retention mode or the power-off mode. If the power-off mode is determined at 721, then the operation flow goes to step 810 of FIG. 8. If the retention mode is determined at 721, the CPU pipeline (e.g., the stages shown in FIG. 3) may be stalled (730). At 740, the power manager 490 may be notified. At 750, the power manager 490 exits the retention mode for the non-integer unit 230. The power manger may generate the voltage control signals 512 to cause the voltage controller 420 to provide the operation voltage to the non-integer unit 230 of the processor core 110. At 760, the power manager 490 marks that the non-integer unit is active (e.g., fully operational). For example, the power manager 490 may set a flag indicating that the non-integer unit 230 is active (e.g., in full operation mode and not in any low-power mode). At 770, the CPU pipeline is un-stalled, and operations resume with the non-integer unit 230 in active mode.

Figure 8:
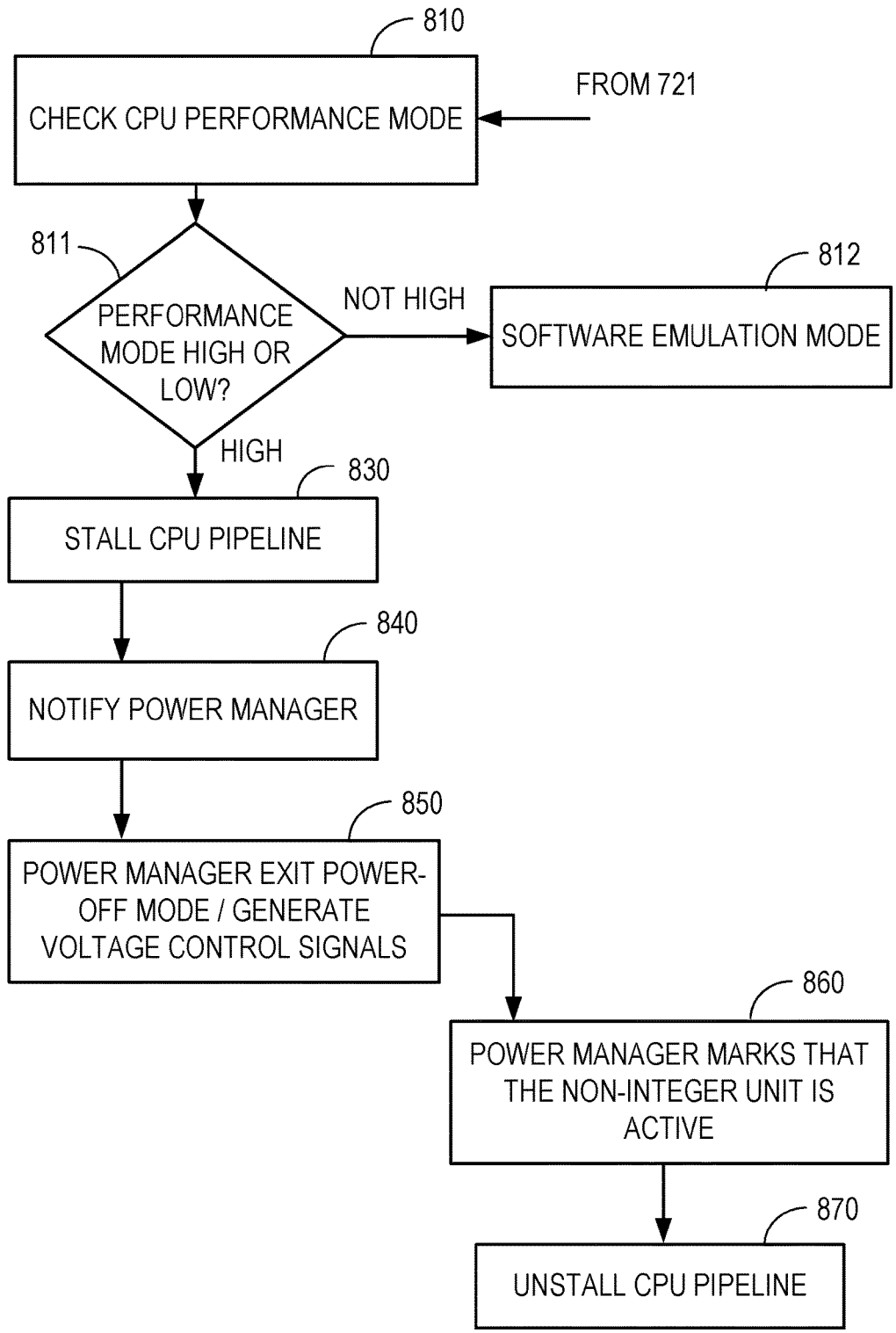
FIG. 8 is a diagram of an exemplary embodiment of another operation flow for exiting a power-off mode.

FIG. 8 is a diagram of an exemplary embodiment of another operation flow for exiting a power-off mode. From operation 721 (FIG. 7), a CPU performance mode is checked (810). For example, a processor core 110 of the processor 100 may check the setting of the CPU performance mode. The CPU performance mode may be set to high (or low) based on a performance demand of the application being executed. At 811, the CPU performance mode is determined to be high or low. If the CPU performance mode is determined to be low at 811, a software emulation mode may be entered to service the non-integer operations (e.g., SIMD or FPU instructions)(812). For example, integer instructions may be issued to emulate the SIMD or FPU instructions, in accordance with the known practices in the art.

If the CPU performance mode is determined to be high at 811, at 830, the CPU pipeline (e.g., the stages shown in FIG. 3) is stalled to allow the non-integer unit 230 to exit the power-off mode. For example, the processor core 110 of the processor 100 may stall the CPU pipeline illustrated in FIG. 3. At 840, the power manager 490 is notified (e.g., by the processor core 110). At 850, the power manager 490 exits the power-off mode for the non-integer unit 230. For example, the power manger may generate the voltage control signals 512 to cause the voltage controller 420 to provide the operation voltage to the non-integer unit 230 of the processor core 110. At 860, the power manager 490 marks that the non-integer unit is active. For example, the power manager 490 may set a flag indicating that the non-integer unit 230 is active (e.g., in full operation mode and not in any low-power mode). At 870, the CPU pipeline is un-stalled, and operations resume with the non-integer unit 230 in active mode.

Figure 9:
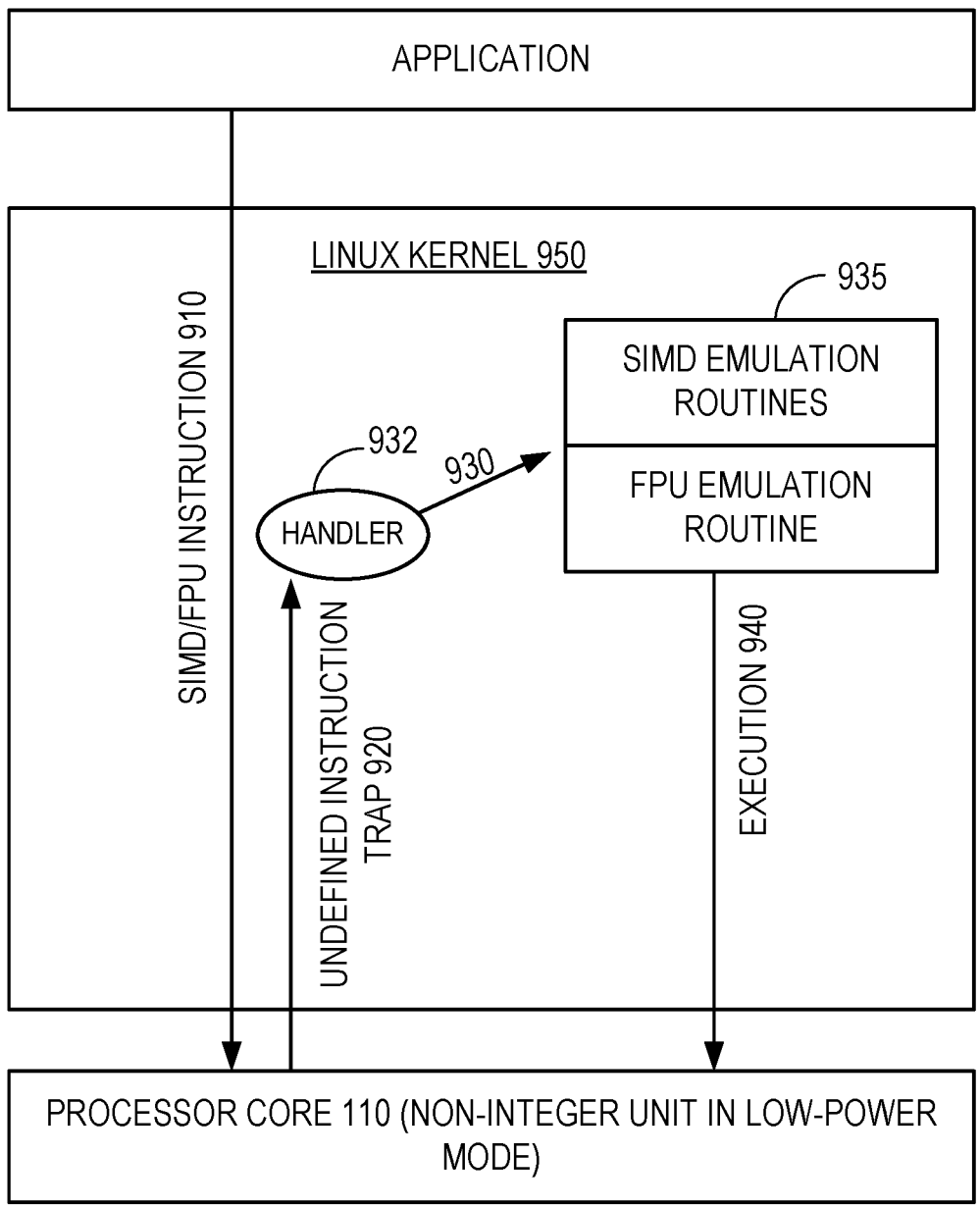
FIG. 9 is a diagram of an exemplary embodiment of a system-level flow for software emulation mode for a non-integer operation.

FIG. 9 is a diagram of an exemplary embodiment of a system-level flow for software emulation mode for a non-integer operation. At 910, the application currently being executed issues to the processor core 110 a non-integer instruction (e.g., SIMD or FPU instruction). The non-integer unit 230 of the processor core 110 is in a power-off mode, and the operating system running on the processor 100 issues an undefined instruction trap 920 (e.g., from operation 812). An interface (e.g., a part of an operating system) between the application and the processor core 110 (e.g., the Linux kernel 950) includes a handler 932. The handler 932 receives the undefined instruction trap 920 and initiates the non-integer instruction emulation routines 935. The non-integer instruction emulation routines 935 substitute complex SIMD/FPU instructions with a set of integer instructions and produces the same (or close approximation) result as the SIMD/FPU instruction. These emulation routines are known in the art and perform well for most cases. At 940, the Linux kernel 950 instructs the processor core 110 to execute the emulation routines.

Figure 10:
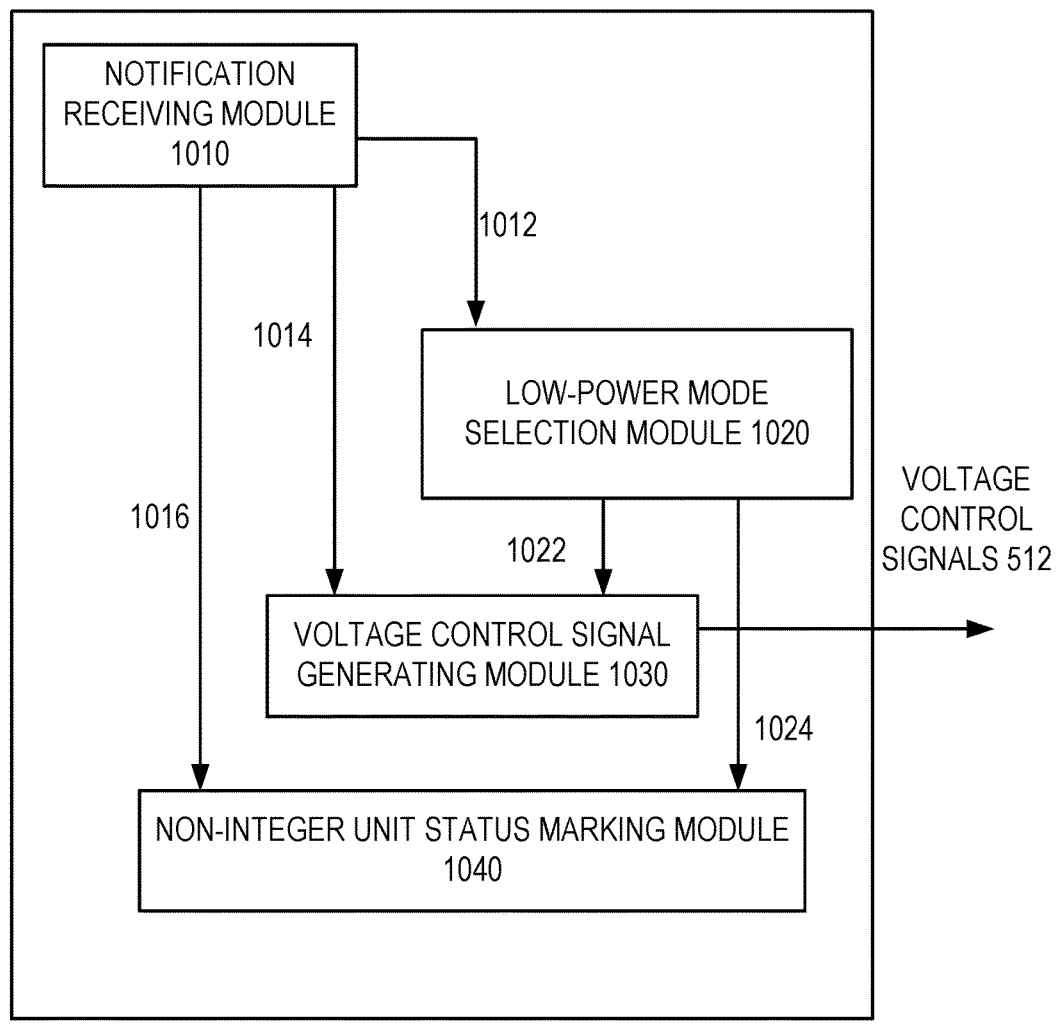
FIG. 10 is a diagram of a hardware implementation for an exemplary embodiment of a power manager.

FIG. 10 is a diagram of a hardware implementation for an exemplary embodiment of a power manager. The power manager 490 may be implemented in hardware/circuit, software, or combination thereof in accordance with the knowledge of persons of ordinary skill in the art. In one example, the power manager 490 may be implemented in part by a processor (e.g., the processor core 110) executing software instructions.

By way of example, a module, or any portion of a module, or any combination of modules may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The power manager 490 includes a notification receiving module 1010, a low-power mode selection module 1020, a voltage control signal generating module 1030, and a non-integer unit status marking module 1040. In an exemplary embodiment, the notification receiving module 1010 may receive notifications from the processor core 110 for, in one example, entering a power-off mode (e.g., the retention mode and the power-off mode) and exiting the power-off mode. See, e.g., operations 620, 740, and 840 presented above. In response to a notification to enter a power-off mode (e.g., operation 630), the notification receiving module may send the notice 1012 to the low-power mode selection module 1020. The low-power mode selection module 1020 may select, for example, the power-off mode or the retention mode for the non-integer unit 230. For example, the selection may be based on the current low-power mode for the non-integer unit 230 and various hysteresis and thresholds for changing among the low-power modes. For example, for the non-integer unit 230 already in retention mode and the non-integer operation utilization dropping below a threshold, the power manage may select the power-off mode for the non-integer unit 230. See, e.g., operations 630.

The low-power mode selection module 1020 may provide the selected low-power mode to the voltage control signal generating module 1030 (1022). In response, the voltage control signal generating module 1030 generates the voltage control signals 512. See, e.g., FIG. 5 regarding various examples of the voltage control signals 512 controlling the supply voltage 422 of the non-integer unit 230. For example, the voltage control signals 512 may instruct the reference voltage generator 510 to output at 514 various low-power voltages, such as the retention voltage. Further, the comparator 520 may receive the voltage control signals 512 to turn off the power switch 530 fully (e.g., for providing the power-off voltage or ground to the non-integer unit 230).

The low-power mode selection module 1020 may provide the selected low-power mode to the non-integer unit status marking module 1040 (1024). For example, the low-power mode selection module 1020 may mark the flag or flags to indicate that the non-integer unit 230 is in the retention mode or the power-off mode. See, e.g., operations 642 and 652.

Further, in response to a notification to exit a power-off mode (e.g., 740 and 840), the notification receiving module may send the notice 1014 to the voltage control signal generating module 1030 (1022). In response, the voltage control signal generating module 1030 generates the voltage control signals 512. See, e.g., FIG. 5 regarding various examples of the voltage control signals 512 controlling the supply voltage 422 of the non-integer unit 230. For example, the comparator 520 may receive the voltage control signals 512 to turn on the power switch 530 fully (e.g., for providing the operation voltage to the non-integer unit 230).

Further, in response to a notification to exit a power-off mode (e.g., 740 and 840), the notification receiving module may send the notice 1016 to the non-integer unit status marking module 1040 (1024). For example, the low-power mode selection module 1020 may mark the flag or flags to indicate that the non-integer unit 230 is in active mode (e.g., receiving the operation voltage). See, e.g., operations 760 and 860.

Figure 11:
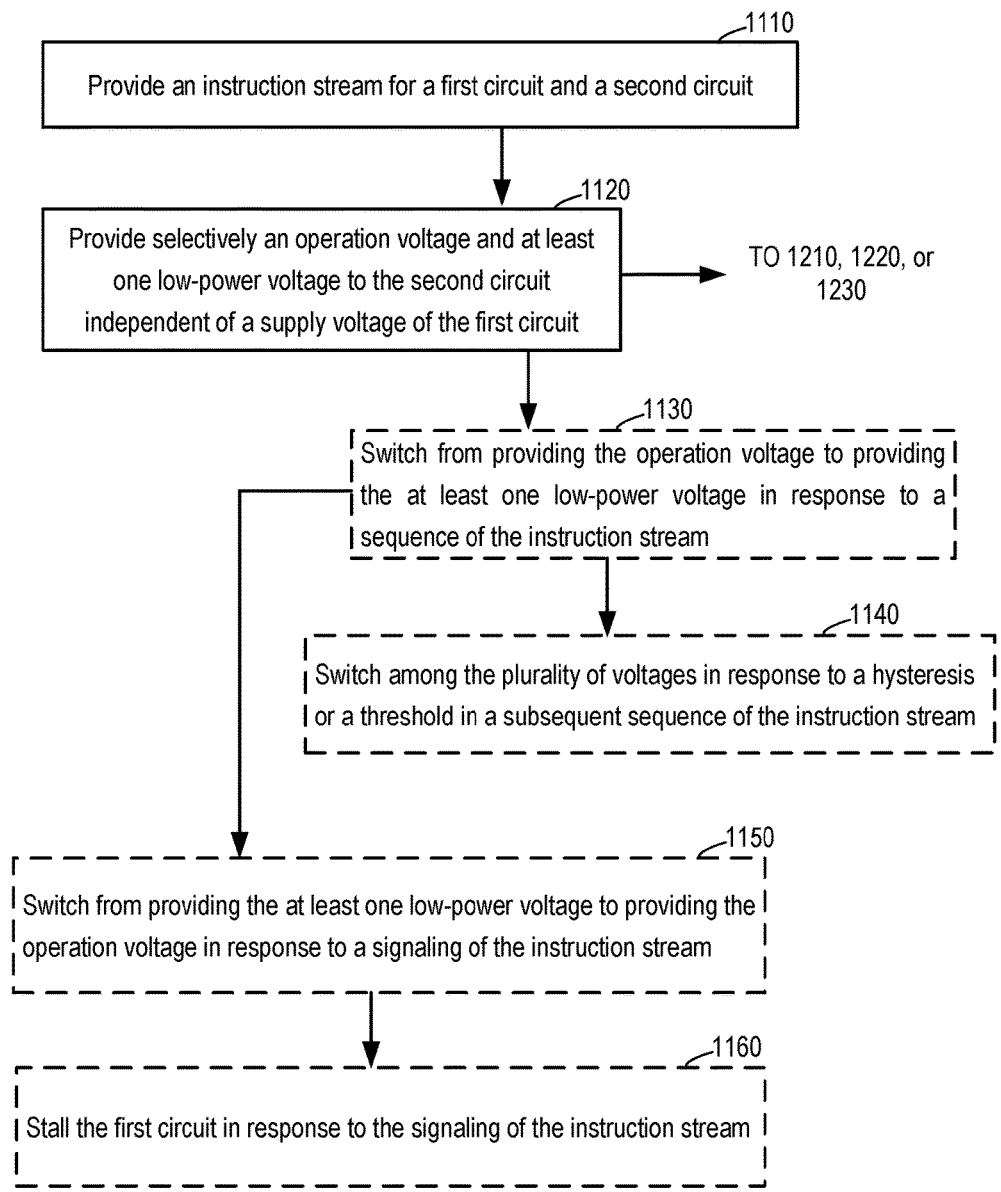
FIG. 11 is a diagram of a flow chart of an exemplary embodiment method operating a power management function.
Figure 12:
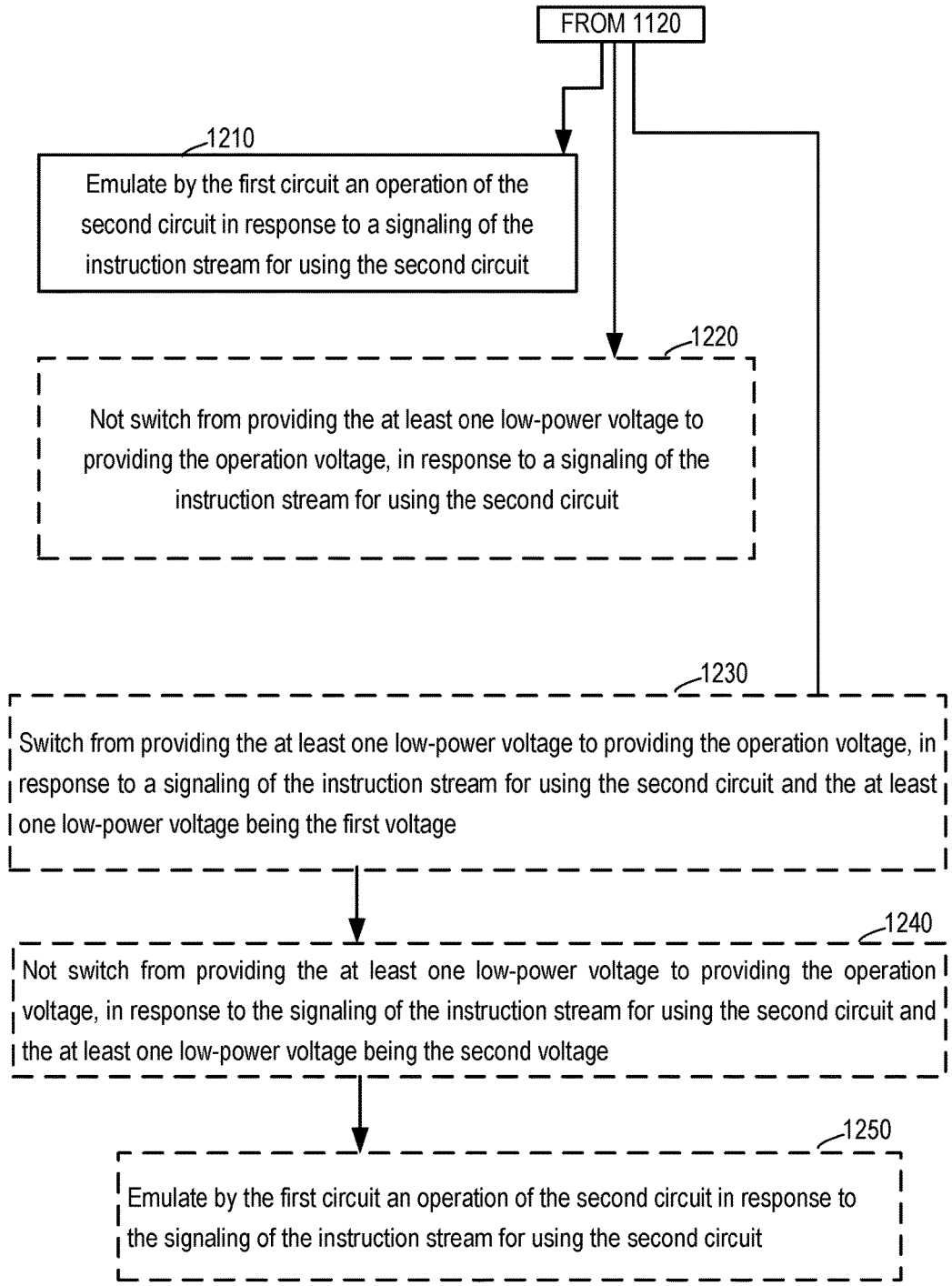
FIG. 12 is a diagram of another portion of the flow chart of an exemplary embodiment method operating a power management function.

FIG. 11 is a diagram of a flow chart of an exemplary embodiment method operating a power management function. FIG. 12 is a diagram of another portion of the flow chart of an exemplary embodiment method operating a power management function. These steps may be performed by the processor core 110. Examples of these steps are provided in FIGS. 3-10 and the associated text. For example, the integer unit 220 may be an example of a first circuit, and the non-integer unit 230 may be an example of the second circuit that shares an instruction stream 360 with the first circuit. The voltage controller 420 may be an example of a voltage controller circuit configured to provide an operation voltage and at least one low-power voltage to the second circuit independent of a supply voltage of the first circuit.

At 1110, an instruction stream for a first circuit and a second circuit is provided. For example, the processor core 110 (e.g., the CPU 222) receives the instruction stream 360 and decodes the instructions therein for both the integer unit 220 (e.g., integer operations 340, 342) and the non-integer unit 230 (e.g., floating point operation 344). At 1120, an operation voltage and at least one low-power voltage are selectively provided to the second circuit independent of a supply voltage of the first circuit. For example, FIGS. 4 and 5 illustrate that a voltage controller 420-1 may be programmed by the power manager 490 to provide a retention voltage or a power-off voltage to the non-integer unit 230 independent of the supply voltage of the integer unit 220. At 1130, the processor core 110 switches from providing the operation voltage to providing the at least one low-power voltage in response to a sequence of the instruction stream. See, e.g., the operations shown in FIG. 6. At 1140, the processor core 110 switches among the plurality of voltages in response to a hysteresis or a threshold in a subsequent sequence of the instruction stream. See, for example, operation 630 shown in FIG. 6. At 1150, the processor core 110 switches from providing the at least one low-power voltage to providing the operation voltage in response to a signaling of the instruction stream. See, e.g., the operations shown in FIGS. 7 and 8. At 1160, the first circuit is stalled in response to the signaling of the instruction stream. See, e.g., operations 730 and 830. For example, the processor core 110 may stall the CPU 222 from executing the stages of the pipeline of FIG. 3.

At 1210 (from step 1120), the first circuit emulates an operation of the second circuit in response to a signaling of the instruction stream for using the second circuit. See, e.g., operation 812 and FIG. 9. At 1220 (from step 1120), the processor core 110 does not switch from providing the at least one low-power voltage to providing the operation voltage, in response to a signaling of the instruction stream for using the second circuit. See, e.g., operation 812 and FIG. 9. In one example, the processor core 110 does not switch from providing the power-off voltage to the non-integer unit 230 to providing the operation voltage, despite detecting a signaling in the instruction stream 360 associated with the non-integer unit 230 (e.g., SIMD/FPU instructions). In a case that the at least one low-power voltage is the power-off voltage, the CPU 222 may execute instructions that emulate the SIMD/FPU instructions.

At 1230, the processor core 110 switches from providing the at least one low-power voltage to providing the operation voltage, in response to a signaling of the instruction stream for using the second circuit and the at least one low-power voltage being the second voltage being the first voltage. See, e.g., the operations of FIG. 7. In a case that the at least one low-power voltage is the retention voltage, the processor core 110 exits the low power mode in response to detecting a signaling of the instruction stream 360 for using the SIMD unit or FPU. At 1240, the processor core 110 does not switch from providing the at least one low-power voltage to providing the operation voltage, in response to the signaling of the instruction stream for using the second circuit and the at least one low-power voltage being the second voltage. See, e.g., operation 812 and FIG. 9. In one example, the processor core 110 does not switch from providing the power-off voltage to the non-integer unit 230 to providing the operation voltage, despite detecting a signaling of the instruction stream 360 for using the SIMD unit or FPU. In a case that the at least one low-power voltage is the power-off voltage, the CPU 222 executes instructions that emulate the SIMD/FPU instructions. At 1250, the first circuit emulates an operation of the second circuit in response to the signaling of the instruction stream for using the second circuit. See, e.g., FIG. 9 for the CPU 222 executing instructions that emulate the SIMD/FPU instructions.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under 35 U.S.C. §112 (f) as a means plus function unless the element is expressly recited using the phrase "means for."

What is claimed is:

1. An apparatus, comprising:
   a first circuit;
   a second circuit, wherein the first circuit and the second circuit share an instruction stream; and
   a voltage controller circuit configured to provide an operation voltage and at least one low-power voltage to the second circuit independent of a supply voltage of the first circuit in response to a sequence of the instruction stream and a performance mode, wherein one of the at least one low-power voltage comprises a power off mode and the voltage controller circuit is further configured to stall an instruction pipeline of the first circuit, exit the power off mode, and unstall the instruction pipeline based on the performance mode.

2. The apparatus of claim 1, wherein the first circuit comprises an integer unit of a processor, and the second circuit comprise a non-integer unit of the processor.

3. The apparatus of claim 1, wherein the at least one low-power voltage comprises a retention voltage.

4. The apparatus of claim 1, wherein the at least one low-power voltage further comprises a power-off voltage.

5. The apparatus of claim 1, wherein the voltage controller circuit is configured to switch from providing the operation voltage to providing the at least one low-power voltage in response to the sequence of the instruction stream.

6. The apparatus of claim 5, wherein the at least one low-power voltage comprises a plurality of voltages, and the voltage controller circuit is configured to switch among the plurality of voltages in response to a hysteresis or a threshold in a subsequent sequence of the instruction stream.

7. The apparatus of claim 1, wherein the voltage controller circuit is configured to switch from providing the at least one low-power voltage to providing the operation voltage in response to a signaling of the instruction stream.

8. The apparatus of claim 7, wherein the signaling of the instruction stream comprises an instruction associated with the second circuit.

9. The apparatus of claim 1, wherein the first circuit is configured to emulate an operation of the second circuit in response to a signaling of the instruction stream for using the second circuit.

10. The apparatus of claim 1, wherein the voltage controller circuit is configured to not switch from providing the at least one low-power voltage to providing the operation voltage in response to a signaling of the instruction stream for using the second circuit.

11. The apparatus of claim 1, wherein the at least one low-power voltage comprises a first voltage and a second voltage, and wherein the voltage controller circuit is configured to switch from providing the at least one low-power voltage to providing the operation voltage, in response to a signaling of the instruction stream for using the second circuit and the at least one low-power voltage being the first voltage.

12. The apparatus of claim 11, wherein the voltage controller circuit is configured to not switch from providing the at least one low-power voltage to providing the operation voltage, in response to the signaling of the instruction stream for using the second circuit and the at least one low-power voltage being the second voltage.

13. The apparatus of claim 12, wherein the first circuit is configured to emulate an operation of the second circuit in response to the signaling of the instruction stream for using the second circuit.

14. A method of operating a power management function, comprising:
   providing an instruction stream for a first circuit and a second circuit; and
   providing selectively an operation voltage and at least one low-power voltage to the second circuit independent of a supply voltage of the first circuit in response to a sequence of the instruction stream, wherein providing selectively the operation voltage and the at least one low-power voltage includes stalling an instruction pipeline of the first circuit, exiting a power off mode, and unstalling the instruction pipeline based on a performance mode, one of the at least one low-power voltage comprises the power off mode.

15. The method of claim 14, wherein the first circuit comprises an integer unit of a processor, and the second circuit comprise a non-integer unit of the processor.

16. The method of claim 14, wherein the at least one low-power voltage comprises a retention voltage.

17. The method of claim 14, wherein the at least one low-power voltage further comprises a power-off voltage.

18. The method of claim 14, wherein the providing selectively the operation voltage and the at least one low-power voltage to the second circuit comprises switching from providing the operation voltage to providing the at least one low-power voltage in response to the sequence of the instruction stream.

19. The method of claim 18, wherein the at least one low-power voltage comprises a plurality of voltages, further comprising switching among the plurality of voltages in response to a hysteresis or a threshold in a subsequent sequence of the instruction stream.

20. The method of claim 14, further comprising switching from providing the at least one low-power voltage to providing the operation voltage in response to a signaling of the instruction stream.

21. The method of claim 20, wherein the signaling of the instruction stream includes an instruction associated with the second circuit.

22. The method of claim 14, emulating by the first circuit an operation of the second circuit in response to a signaling of the instruction stream for using the second circuit.

23. The method of claim 14, further comprising not switching from providing the at least one low-power voltage to providing the operation voltage, in response to a signaling of the instruction stream for using the second circuit.

24. The method of claim 14, wherein the at least one low-power voltage comprises a first voltage and a second voltage, further comprising switching from providing the at least one low-power voltage to providing the operation voltage, in response to a signaling of the instruction stream for using the second circuit and the at least one low-power voltage being the first voltage.

25. The method of claim 24, further comprising not switching from providing the at least one low-power voltage to providing the operation voltage, in response to the signaling of the instruction stream for using the second circuit and the at least one low-power voltage being the second voltage.

26. The method of claim 25, further comprising emulating by the first circuit an operation of the second circuit in response to the signaling of the instruction stream for using the second circuit.

27. An apparatus, comprising:
a first circuit;
a second circuit, wherein the first circuit and the second circuit share an instruction stream; and
means for generating voltage control signals that provide selectively an operation voltage and at least one low-power voltage to the second circuit independent of a supply voltage of the first circuit in response to a sequence of the instruction stream and a performance mode, wherein one of the at least one low-power voltage comprises a power off mode and the means for generating voltage control signals is further configured to stall an instruction pipeline of the first circuit, exit the power off mode, and unstall the instruction pipeline based on a performance mode.

* * * * *